United States Patent [19]
Ladany et al.

[11] 3,916,339
[45] Oct. 28, 1975

[54] ASYMMETRICALLY EXCITED SEMICONDUCTOR INJECTION LASER

[75] Inventors: Ivan Ladany, Stockton; Donald Paul Marinelli, Trenton; Henry Kressel, Elizabeth; Vincent Michael Cannuli, Trenton, all of N.J.

[73] Assignee: RCA Corporation, New York, N.Y.

[22] Filed: Nov. 25, 1974

[21] Appl. No.: 527,053

[52] U.S. Cl............ 331/94.5 H; 331/94.5 C; 357/18
[51] Int. Cl.²..................... H01S 33/19; H01S 3/098
[58] Field of Search..... 357/18; 331/94.5 H, 94.5 C; 350/96 WG; 307/88.3

[56] References Cited

UNITED STATES PATENTS

| | | | |
|---|---|---|---|
| 3,740,661 | 6/1973 | D'Asaro | 331/94.5 H X |
| 3,790,902 | 2/1974 | Miller | 350/96 WG X |
| 3,849,790 | 11/1974 | Gottsmann et al. | 357/18 |
| 3,883,821 | 5/1975 | Miller | 331/94.5 H |

*Primary Examiner*—James W. Lawrence
*Assistant Examiner*—Marvin Nussbaum
*Attorney, Agent, or Firm*—Glenn H. Bruestle; Donald S. Cohen; George E. Haas

[57] ABSTRACT

A diode laser is improved in order to produce an output in a single longitudinal mode. The laser has a rectangular body with two regions of differing conductivity type material. Extending from one surface of the rectangular body and into one of the regions of differing conductivity material is a third region. Although the third region is composed of the same general conductivity type material as the region into which it extends, it is more highly doped with conductivity modifiers (more conductive). This third region extends along one surface between the ends of the body and is spaced from the sides of the body. An electrical contact stripe is positioned on the one surface so that a portion of its width overlaps a portion of the width of the third region.

5 Claims, 2 Drawing Figures

44 42 46 38 40
40
16
36
10
28
34
30
12
32
26
31
22
24
14

ASYMMETRICALLY EXCITED SEMICONDUCTOR INJECTION LASER

BACKGROUND OF THE INVENTION

The invention disclosed herein was made in the course of, or under, a contract or subcontract thereunder with the Department of the Navy.

This invention relates to semiconductor lasers and, more specifically, to lasers for producing single longitudinal mode operation.

It is well known that the coherent light from a semiconductor laser is composed of a plurality of longitudinal modes. A longitudinal mode is a discrete frequency component of the electromagnetic wave which propogates axially between the parallel mirrors of the laser cavity. Each longitudinal mode must satisfy the equation $$m = \frac{2nl}{\lambda}$$

where $m$ is any positive integer, $n$ is the refractive index of the laser cavity, $l$ is the length of the laser cavity and $\lambda$ is the wavelength.

It is highly desirable in certain applications to minimize the number of longitudinal modes and ideally to produce an output having a single longitudinal mode. Since single longitudinal mode output has a smaller spectral width, the single mode lasers are more easily integrated into certain optical systems than multi-mode devices, for example, in the case of optical fiber transmission, improved high frequency transmission is achieved using a laser diode with a single mode emission.

Heretofore, it has been extremely difficult to produce semiconductor lasers which operate in a single longitudinal mode. Less than one out of every one hundred laser devices produced, exhibited single mode output. The full advantages of single longitudinal mode operation therefore could not be realized.

SUMMARY OF THE INVENTION

A semiconductor injection laser has a rectangular body with a first and a second surface, two sides, and two ends. The ends are partially reflective forming a Fabry-Perot cavity. The laser body is divided into a first and a second region which extends along the first and second surfaces respectively. The two regions are composed of opposite conductivity type material.

A third region runs between the two ends and is spaced from the sides. The third region extends from the second surface for a depth less than the depth of the second region. The second and third regions are of the same conductivity type material, but the third region is more heavily doped.

An electrical contact stripe is positioned on the second surface. The contact stripe overlaps a portion of the width of both the second and third regions. The first surface also has an electrical contact applied to it.

DETAILED DESCRIPTION

Figure 1:
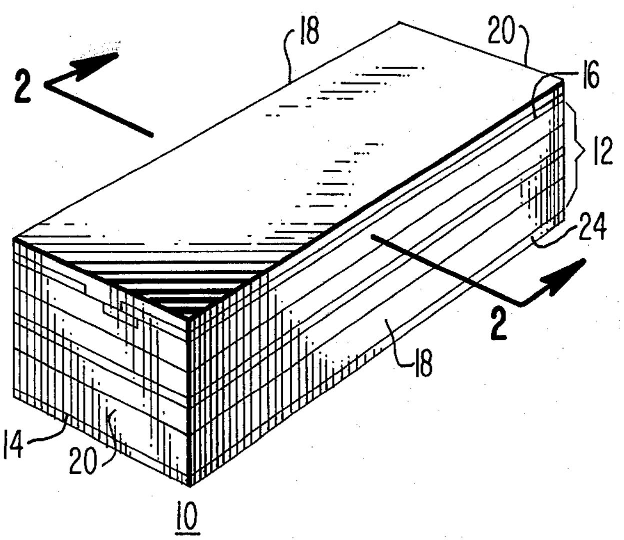
FIG. 1 is a perspective view of one form of the semiconductor laser of the present invention.

As shown in FIG. 1, the preferred embodiment of a semiconductor injection laser 10 comprises a right parallelepiped body 12, formed of a single crystalline semiconductor material. The body 12 has two opposed side surfaces 18, two opposed end surfaces 20 and a first and a second surface 14 and 16 respectively. The two end surfaces 20 are partially reflective to light so as to form a Fabry-Perot cavity. The body 12 has an electrical contact 24 applied to the first surface 14 in a manner as to insure a good ohmic contact with the first surface.

Figure 2:
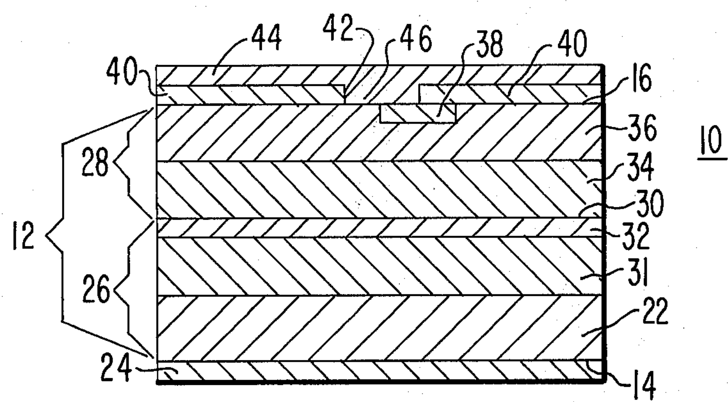
FIG. 2 is a cross-sectional view taken on line 2—2 of FIG. 1.

The structure of the laser 10 is shown in more detail in FIG. 2. The body 12 is composed of a first region 26 extending along the first surface 14. The first region 26 is composed of one conductivity type material (either p or n type). A second region 28 is contiguous with the first region 26 and extends along a portion of the second surface 16. The second region 28 is composed of the opposite conductivity type material. A p-n junction 30 is formed at the interface of the first and second regions 26 and 28.

The first region 26 comprises a substrate 22 of highly doped (high conductivity) material, a first epitaxial layer 31 and a second epitaxial layer 32. The substrate 22 extends along the first surface 14 and the second epitaxial layer 32 extends along the PN junction 30. The first epitaxial layer 31 is between the substrate 22 and the second epitaxial layer 32. The second region 28 is composed of a third epitaxial layer 34 which extends along the PN junction 30 and a fourth epitaxial layer 36 which extends along the second surface 16. The second epitaxial layer 32 forms the recombination region of the laser 10 and has a narrower energy bandgap than either the first epitaxial layer 31 or the third epitaxial layer 34.

A narrow third region 38 extends along part of the second surface 16 and into the second region 28 for about one-third to one-half the depth of the fourth layer 36. The third region 38 is spaced from the side surfaces 18 and runs from one end surface 20 to the other. Although the third region 38 is composed of the same general conductivity type material as the second region 28, it is more highly doped with conductivity modifiers (more conductive) than the fourth epitaxial layer 36.

Applied to the second surface 16 of the body 12 are two spaced strips 40 of insulating material, such as silicon dioxide. The two strips 40 extend along opposite sides of the second surface 16 from one end surface 20 to the other end surface. One of the strips 40 overlaps a portion of the third region 38. The overlap may be typically but not limited to one-half the width of the third region 38. The spacing between the strips 40 forms a channel 42 which may be but not necessarily equal in width to the width of the third region 38. An electrically conductive layer 44 extends over both of the strips 40 and into the channel 42 forming a contact stripe 46 on the second surface 16. Due to the configuration of the channel 42, a portion of the width of the contact stripe 46 overlaps a portion of the width of the third region 38, while the remainder of the contact stripe overlaps a portion of the fourth layer 36.

When a forward bias voltage is applied between the electrical contact 24 and the conductive layer 44, the current flow through the body 12 will be limited to the portion of the width of the body 12 which is covered by contact stripe 46. Because the contact stripe 46 overlaps both the third region 38 and the fourth layer 36, the current will flow through both of them. However, since the third region 38 has a higher conductivity, more current will flow through the third region 38 and the portion of the second region 28 between the third region 38 and first region 26, than will flow directly through the second region 28.

This excitation produces lasing within the laser 10 in generally the same manner as in conventional lasers without the contact stripe 46 being offset from the third region 38. However, due to the asymmetric current flow in the improved laser 10, about 40 percent of these devices emit light having a single longitudinal mode. The increased probability of single longitudinal mode operation is due to the offset of the contact stripe 46 from the third region 38.

In a variation of the preferred embodiment, the third region 38 could extend into the first region 26 from the first surface 14 and the conductive layer 44 and stripes 40 could be positioned on the first surface 14, in a manner similar to that described in FIGS. 1 and 2. In this variation, the electrical contact 24 is applied to the second surface 16.

Furthermore, the improvement may be incorporated into laser structures other than the specific one shown in FIGS. 1 and 2. Descriptions of some of these other laser structures can be found in the articles: "Close-Confinement Gallium Arsenide PN Junction Lasers with Reduced Optical Loss at Room Temperature" by H. Kressel et al., RCA REVIEW, Volume 30, No. 1, pages 106–113, March 1969; "High-Order Transverse Cavity Modes in Heterojunction Diode Lasers" by J. Butler et al., APPLIED PHYSICS LETTERS, Vol. 17, No. 9, Nov. 1, 1970, pages 403–406; and "An Efficient Large Optical Cavity Injection Laser" by H. F. Lockwood et al., APPLIED PHYSICS LETTERS, Vol. 17, No. 12, Dec. 1, 1970, pages 499–502.

What is claimed is:

1. A semiconductor injection laser comprising:

a right parallelepiped body composed of single crystalline semiconductor material, said body having two opposed side surfaces, a first and a second surface, and two opposed end surfaces which are partially reflective so as to provide a Fabry-Perot cavity;

said body having a first region of one conductivity type material, extending along said first surface, a second region of the opposite conductivity type material contiguous with said first region and extending along the second surface, and a third region running from one end surface to the other end surface spaced from the side surfaces and extending from the second surface into the second region for less than the full depth of the second region, said third region being of the same conductivity type as the second region but having a higher conductivity;

an electrical contact stripe on the second surface extending between the two end surfaces, said contact stripe overlaps a portion of the width of both the second and third regions; and an electrically conductive layer applied to the first surface.

2. The laser as in claim 1 wherein said contact stripe is equal in width to the width of said third region.

3. The laser in claim 1 wherein said contact stripe overlaps one half the width of said third region.

4. The laser as in claim 1 wherein:

the first region is comprised of a substrate extending along said first surface, a first layer contiguous with said substrate, and a second layer extending between said first layer and the interface between said first and second regions, said second layer having a narrower energy bandgap width than said first layer; and said second region comprising a third layer extending along the interface between said first and second regions, and a fourth layer extending along a portion of the second surface.

5. The laser as in claim 4 wherein said third region extends from said second surface for a depth of between one-third to one-half the depth of said fourth layer.

* * * * *